June 28, 1949.    L. G. HOWELL    2,474,581
WELL LOGGING
Filed April 19, 1945
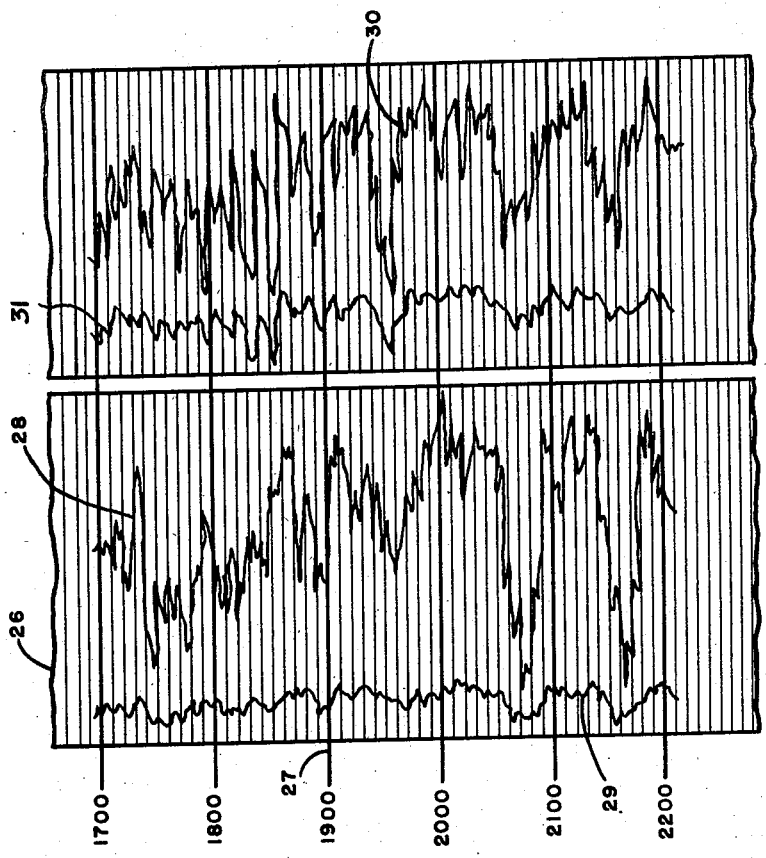
FIG. 3.
FIG. 2.
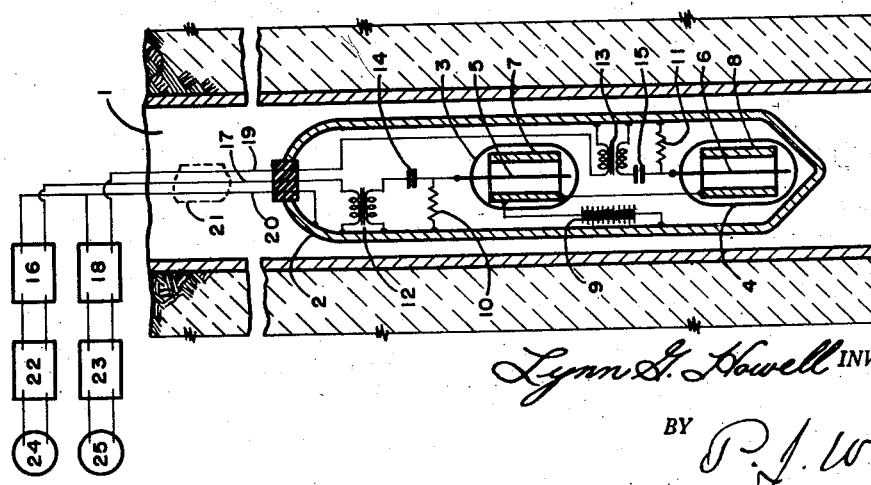
FIG. 1.
Lynn G. Howell INVENTOR.
BY P. J. Whelan
ATTORNEY.

Patented June 28, 1949

2,474,581

UNITED STATES PATENT OFFICE 2,474,581

WELL LOGGING

Lynn G. Howell, Silver Spring, Md., assignor to Standard Oil Development Company, a corporation of Delaware Application April 19, 1945, Serial No. 589,206

2 Claims. (Cl. 250—83.6)

This invention relates to the logging of boreholes by measuring the radioactivity of the geologic layers traversed by the borehole, either before or after casing is set. The radioactive intensity of the geologic layers gives valuable clues regarding their nature and contents and permits of correlating strata between boreholes and of delineating geologic structure.

The present invention relates to the measuring of the radioactivity directly inside the borehole by lowering a radiation sensitive instrument in the hole. The radioactivity can be recorded either inside the instrument in the borehole or at the surface. For many reasons immediately apparent to those familiar with the art, it is obviously desirable to record at the surface, and the figures given later in this specification depict apparatus and means for recording at the surface. The invention is not, however, restricted to surface recording.

In copending application Serial No. 224,504, filed August 12, 1938, now Patent No. 2,391,093, and entitled "Radioactivity well logging" there are described two embodiments of well logging apparatus of this type, the one utilizing an ionization chamber and the other utilizing a Geiger-Mueller counter. It is to well logging with the latter type that the present invention is directed and to this extent this application is a continuation-in-part of Serial No. 224,504.

In well logging operations using a detector of radioactive emanations such as a Geiger counter, there are often obtained spurious values which are peculiar to the particular counter. If a log is rerun to check these values, the difficulty is encountered that the depth measurements of the first log are often not reproducible.

According to the present invention these difficulties are avoided by using two or more radioactive responsive devices in spaced relation to each other for well logging. In this way spurious indications peculiar to one device are not reproduced in the other so that by comparison of the records one can tell which values are spurious and which are significant. Moreover, since the spacing of the devices is fixed, a plurality of records free from depth measurement error are obtained. Finally and more important, a plurality of records produced with the same travel rate of the detector are obtained. This is highly desirable since the travel rate of the detector has a marked influence on the record with the result that a record of a run is hard to reproduce in a repeat run because travel rate of the responsive device varies not only from run to run but from point to point in the same run.

More specifically, the present invention contemplates the utilization of two or more detectors having a different degree of response to the emanations being measured. This expedient insures the elimination of any spurious values which may be associated with the sensitivity of the detector.

Further objects and advantages of the present invention will appear from the following detailed description of the accompanying drawing, in which Fig. 1 is a vertical section of a borehole with a logging device according to the present invention in operative position;

Fig. 2 is a section of a log produced in a given well; and

Fig. 3 is a section of a log representing a neighboring well down-dip from the first well.

Referring to the drawing in detail number 1 designates a cased borehole in which is disposed a bomb 2 having a metal wall of sufficient strength to stand the pressures encountered. Inside the bomb are two Geiger counters 3 and 4 provided with collecting wires 5 and 6 respectively and outer electrodes 7 and 8 respectively and powered by battery 9. The collecting wires are connected to the wall of bomb 2 through high resistances 10 and 11 respectively, and to primaries of transformers 12 and 13 respectively through condensers 14 and 15 respectively.

The secondary of transformer 12 is connected to amplifier 16 at the surface by conductor 17. The secondary of transformer 13 is connected to amplifier 18 at the surface by conductor 19. The transformers are both grounded to the wall of bomb 2 which, in turn, is connected to amplifiers 16 and 18 by conductor 20. The conductors are insulated by insulation 21.

The outputs of amplifiers 16 and 18 are fed to frequency meters 22 and 23 respectively. The outputs of meters 22 and 23 are recorded by recording galvanometers 24 and 25 respectively. In this case galvanometer 25 was more sensitive than galvanometer 24. These galvanometers are of the photographic recording type in which the galvanometer light beam plays on a photographic strip which moves in synchronism with bomb 2 and is provided with depth markings.

In Fig. 2 is shown a portion of a record obtained by the use of the above described apparatus. The record strip 26 is provided with depth lines 27. The irregular line 28 is a record of the output frequency meter 23 which in turn is actuated by Geiger counter 4. The irregular line 29 is a record of the output of frequency meter 22 which in turn is actuated by Geiger counter 3.

In Fig. 3 is shown a portion of a record typical of a well down-dip from the well represented by the record of Fig. 2. Here the line 30 represents the output of frequency meter 23 while line 31 represents the output of frequency meter 22.

It will be observed that in each case the two lines reflecting the responses of the respective counters show corresponding peaks and troughs which are spaced from each other the distance between the counters.

The nature and objects of the present invention having been fully described and illustrated, what I desire to claim is:

1. A method for logging a borehole which comprises passing through the borehole simultaneously and at the same speed a plurality of spaced Geiger-Mueller detectors of radiations resulting from nuclear disintegrations thereby obtaining two separate electrical impulse counts responsive to radioactivity along the borehole, converting said counts into proportional varying electrical signals and recording separately said signals.

2. A method for logging a borehole which comprises passing through the borehole simultaneously and at the same speed a plurality of spaced Geiger-Mueller detectors of radiations from nuclear disintegrations, said detectors differing from each other in their degree of response to said radiations, thereby obtaining two separate electrical impulse counts responsive to radioactivity along the borehole, converting said counts into proportional varying electrical signals and recording separately said signals.

LYNN G. HOWELL.

REFERENCES CITED

The following references are of record in the file of this patent:

UNITED STATES PATENTS

| Number | Name | Date |
| --- | --- | --- |
| 2,296,176 | Neufeld | Sept. 15, 1942 |
| 2,332,873 | Silverman | Oct. 26, 1943 |

OTHER REFERENCES

Shrum and Smith: Canadian Journal of Research, vol. 11, 1934, pp. 652–657.